(12) United States Patent
Masuda et al.

(10) Patent No.: US 7,510,798 B2
(45) Date of Patent: Mar. 31, 2009

(54) STORAGE BATTERY DEVICE AND POWER SOURCE APPARATUS COMPRISING IT

(75) Inventors: Hideki Masuda, Osaka (JP); Hiroshi Tasai, Kyoto (JP); Koichi Nishiyama, Kyoto (JP)

(73) Assignee: GS Yuasa Corporation, Kyoto (JP)

( * ) Notice: Subject to any disclaimer, the term of this patent is extended or adjusted under 35 U.S.C. 154(b) by 667 days.

(21) Appl. No.: 10/479,370

(22) PCT Filed: Jun. 4, 2002

(86) PCT No.: PCT/JP02/05499

§ 371 (c)(1),
(2), (4) Date: Jun. 7, 2004

(87) PCT Pub. No.: WO02/099922

PCT Pub. Date: Dec. 12, 2002

(65) Prior Publication Data

US 2004/0247994 A1    Dec. 9, 2004

(30) Foreign Application Priority Data

Jun. 5, 2001    (JP) .............................. 2001-169938

(51) Int. Cl.
*H01M 2/26* (2006.01)
(52) U.S. Cl. ...................... 429/121; 429/90; 429/66; 429/67
(58) Field of Classification Search .................. 429/121, 429/66, 67, 90
See application file for complete search history.

(56) References Cited

U.S. PATENT DOCUMENTS 3,378,406 A    4/1968    Rosansky 4,076,906 A *  2/1978    Jensen ........................ 429/90

FOREIGN PATENT DOCUMENTS

| JP | 05-326027   |   | 12/1993 |
|----|-------------|---|---------|
| JP | 06-005123   |   | 1/1994  |
| JP | 06-052901   |   | 2/1994  |
| JP | 7-335274    | A | 12/1995 |
| JP | 63-268445   |   | 11/1998 |
| JP | 11-162527   | A | 6/1999  |
| JP | 11-295173   |   | 10/1999 |
| JP | 2000-173676 |   | 6/2000  |
| JP | 2000-340264 |   | 12/2000 |
| JP | 2000-353552 |   | 12/2000 |
| JP | 2001-060466 |   | 3/2001  |
| JP | 2002-117911 | A | 4/2002  |

OTHER PUBLICATIONS

International Search Report completed Aug. 29, 2000 in International (PCT) Application PCT/JP 02/05499 of which the present application is the National Stage.

* cited by examiner

*Primary Examiner*—Jane Rhee
(74) *Attorney, Agent, or Firm*—Wenderoth, Lind & Ponack, L.L.P.

(57) ABSTRACT

An assembled battery device comprising a plurality of single cells which are placed with a predetermined space between each of them and an element for detecting swelling is set in the predetermined space between the single cells and operates in accordance with the transformation of the single cells by swelling. Therefore, when a single cell swells and transforms, resulting from being overcharged, the element for detecting swelling is activated in accordance with such transformation and detects the state of overcharging.

13 Claims, 10 Drawing Sheets

STORAGE BATTERY DEVICE AND POWER SOURCE APPARATUS COMPRISING IT

FIELD OF THE INVENTION

The present invention relates to an assembled battery device comprising a plurality of single cells, and a power supplying device using this assembled battery device.

BACKGROUND OF THE INVENTION

In general, a secondary battery, which can be recharged and used repeatedly, is used as an assembled battery in which a plurality of single cells is assembled depending on the load. When a single cell is overcharged during the charging of such an assembled battery, the life of the single cell could be adversely affected. Therefore, it is necessary to prevent each single cell from being overcharged during the charging process.

When a single cell is overcharged, some changes are brought about in the single cell including an increase in charge voltage over a predetermined voltage; an abnormal rise in temperature; or transformation of the surface by swelling, which results when a polar plate inside the single cell swells and accordingly pushes out on the surface. Monitoring these changes, therefore, allows the overcharging of a single cell to be detected.

There are several approaches for preventing the overcharging of a single cell. One of them is to monitor a single cell charge voltage on the side of a charging device during the charging of an assembled battery, in which when the charge voltage exceeds a predetermined voltage, the charging of the assembled battery will be terminated. In case of any failure of the charging device, however, it becomes impossible to stop charging on the basis of a single cell charge voltage.

Another approach is to detect the surface temperature of a single cell with a temperature sensor and the like, in which, when a surface temperature exceeds a predetermined temperature, the sensor will detect overcharging. Usually, however, there is a difference in temperature between the inside and the surface of a single cell, and also the surface temperature of a single cell is subject to changes of ambient temperature. Accordingly, it becomes difficult to grasp the definite temperature inside a single cell enough to shut off charging.

Another approach, as disclosed in publication of the unexamined Japanese patent application 2000-353552, is to house single cells in a container in which a space is left between the inner wall of the container and the surface of a single cell, and in which a switch is installed so as to operate by being pressed. According to this configuration, if a single cell is overcharged and then excess transformation by swelling occurs on the surface of the single cell, the switch will end up being pressed by the swollen single cell surface and this will lead to termination of charging. Thus, this approach allows the problems previously described to be prevented from occurring and makes detection of overcharge possible.

However, these types of assembled batteries usually require a ventilation space between single cells to help dissipate the heat from them. Therefore, the use of the above described configuration, where installation of the switch results in the need of a space between the inner wall of the container and each single cell, leads to an increase in size, and consequently concerns about a considerably large place for installation.

The present invention has been developed in view of such circumstances. It is an object of the invention to provide both an assembled battery device and a power supplying device using this assembled battery device so as to make the overcharging of a single cell surely detectable and avoid an increase in battery size.

SUMMARY OF THE INVENTION

In an embodiment of the present invention, an assembled battery device comprises a plurality of single cells with a predetermined space between them, and elements for detecting swelling of the cells. Each element is placed in the space between the single cells and activated in accordance with the transformation of the cells by swelling. According to this configuration, when a single cell swells and transforms due to overcharging, the element for detecting swelling is activated, so that overcharging can be detected.

When single cells of a cuboid shape are used, it is preferable to arrange them in such a manner that side walls having the largest area are placed opposite each other and an element for detecting swelling are put almost on the center part of the side wall having the largest area. This is because the degree of transform by swelling becomes maximum at the center part of the side wall having the largest area of any other side walls in a single cell. Installing an element for detecting swelling at this position, therefore, makes transform by swelling much more detectable. In addition, regarding the shape of a single cell, an ellipsoidal shape, where the cross section is an elliptic cylindrical shape, is also applicable. In case of single cells of this shape, side walls with a major axis are placed opposite each other and an element for detecting swelling is put almost on the center part of the side wall. Thus, as described above, transform by swelling can be detected at this position with much more certainty.

DETAILED DESCRIPTION OF THE INVENTION

Figure 1:
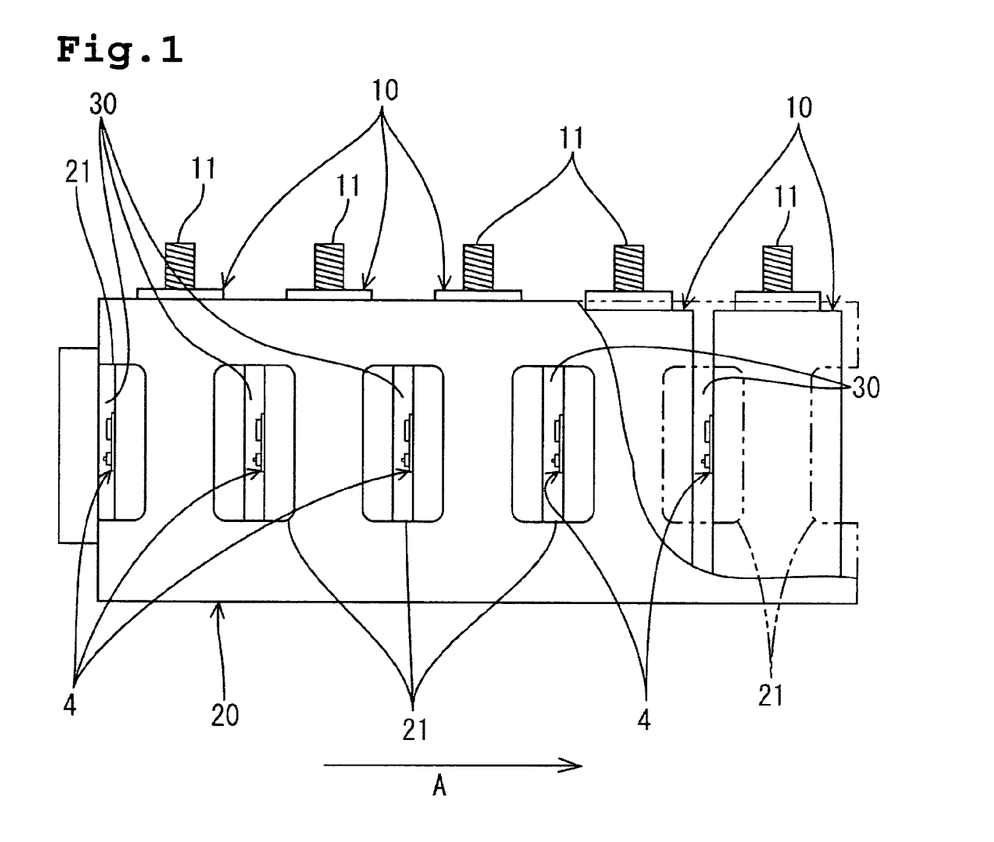
FIG. 1 is a side view of an assembled battery device in a power supplying device in accordance with a first embodiment of the present invention.

Hereinafter, a first embodiment in which a power supplying device of the present invention is embodied will be described with reference to FIGS. 1 to 4. In FIG. 1, the direction of the arrow A indicates the direction of depth.

The power supplying device in the first embodiment comprises an assembled battery device 1 which collectively houses a plurality of lithium-ion single cells 10 (hereinafter referred to as single cells 10) in a case 20, and a charger 2 to charge these single cells 10.

Figure 2:
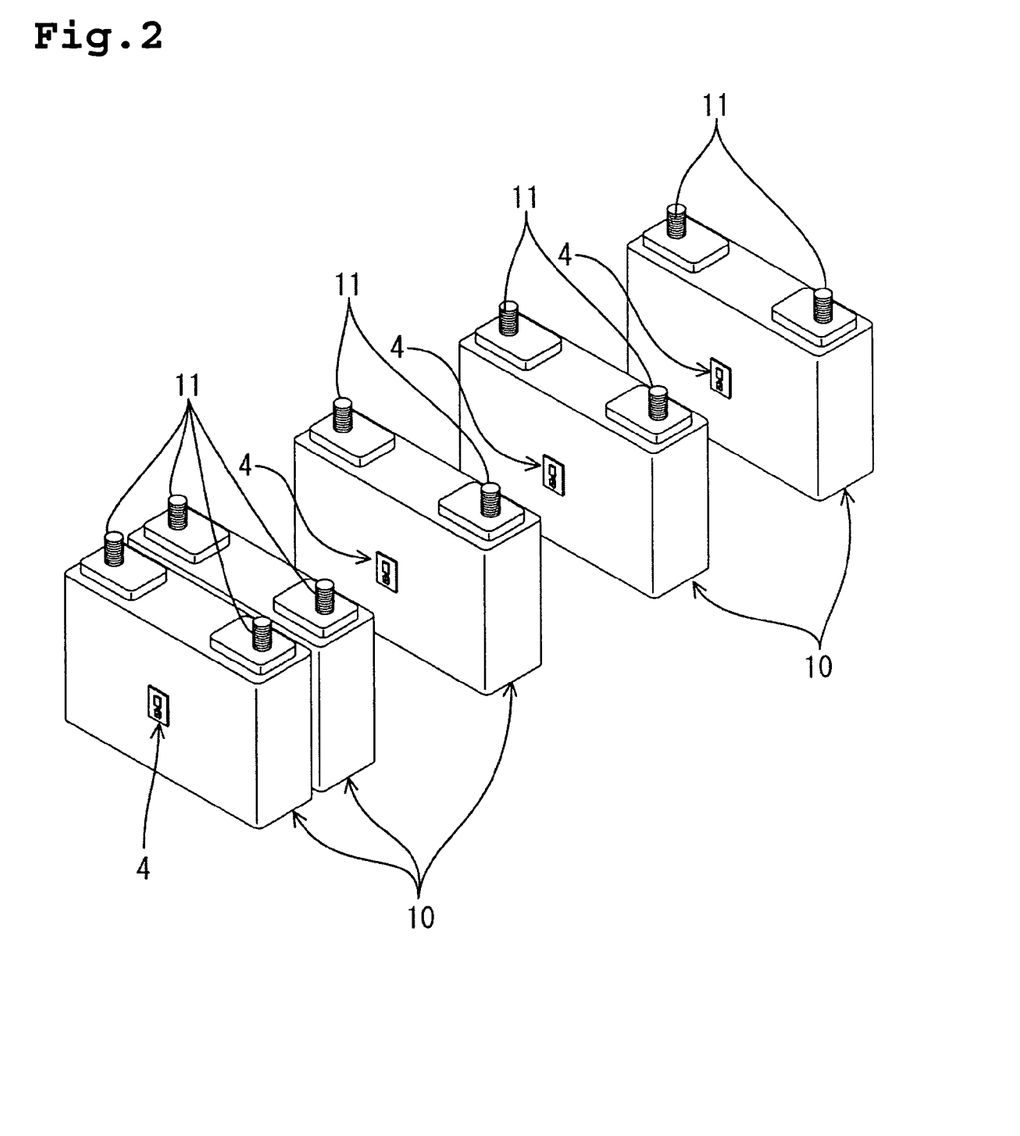
FIG. 2 is a perspective view of the assembled battery device in the power supplying device in accordance with the first embodiment of the present invention.

The case 20 has a fully open top surface and is a rectangular container shape longer in the direction of depth. In the four side walls of the case, a plurality of holes 21 of a square shape is pierced at a predetermined interval. In the case 20, a plurality of single cells 10 are arranged in the direction of depth. These single cells 10 are placed with a space 30 between each single cell 10 so that the heat generated from the single cells 10 during charging can be dissipated readily. For example, generated heat flows together with the air passing through the space 30 and dissipates through the open top surface or the holes 21 in the case 20 to the outside atmosphere.

Figure 3:
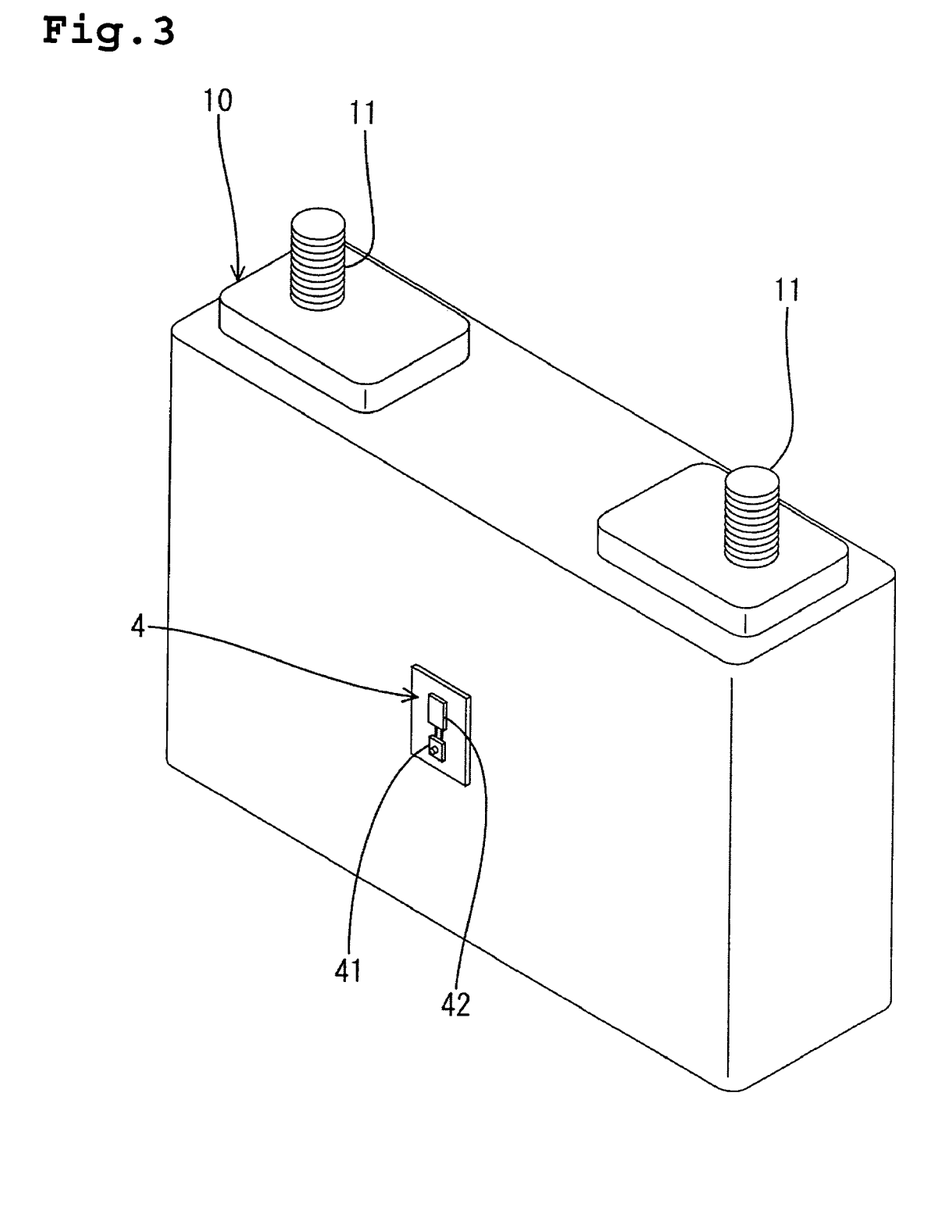
FIG. 3 is a perspective view of one single cell in the assembled battery device in accordance with the first embodiment of the present invention.
Figure 4:
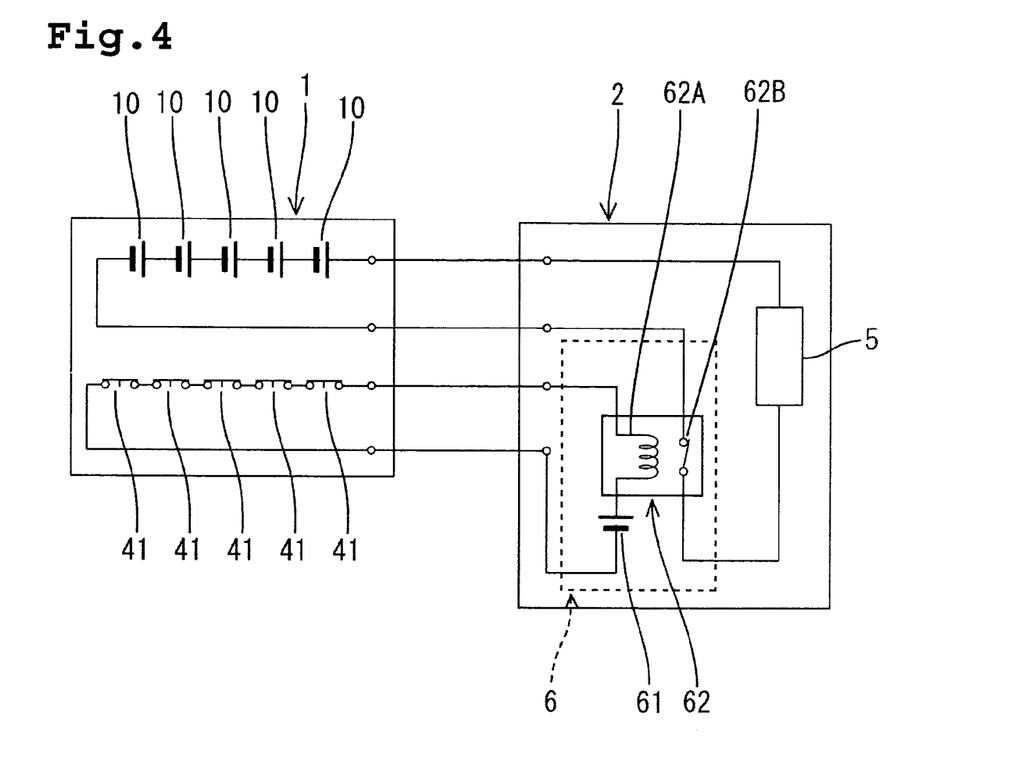
FIG. 4 is a circuit diagram of the power supplying device in accordance with the first embodiment of the present invention.

Each single cell 10 is a cuboid shape and the front and back walls of the single cell 10 have the largest area of any other side walls. On the top surface of the single cell 10, positive and negative terminals 11 of a column shape are placed so as to be connected to the positive and negative electrode plates in the single cell 10. For example, in a pair of single cells 10 adjoining longitudinally, connecting a positive terminal 11 of the forward single cell 10 and a negative terminal of the backward single cell 10 with an electric wire (not shown) allows these single cells 10 to be connected in series. Furthermore, in such series-connected single cells 10, a negative terminal 11 of the forefront and a positive terminal 11 of the rear end are connected to a charger 2 with an electric wire and consequently, inside the charger 2, connected to a charging circuit 5 (equivalent to a power supplying device described in Claim.)

On the center part of the front wall of a single cell 10, a circuit board 4 is fixed with adhesive and the like. The circuit board 4 is equipped with a push button switch 41 with constant closed contact (equivalent to an element for detecting swelling), and a male connector 42 with two terminal fittings. The both ends of the push button switch 41 are connected respectively to the terminal fittings of the male connector 42, with which a plurality of female connectors, not shown, is configured so as to be fitted. Through an electric wire connecting individual female connectors, push button switches 41 result in being connected in series each other. The series circuit of a plurality of push button switches 41 thus formed is connected to the charger 2 and, inside the charger 2, connected in series to a DC power source 61 and a relay coil 62A of a relay 62. In addition, a relay switch 62B of the relay 62 has constant opened contact, which is kept open when electricity is not being conducted to the relay coil 62A, and is connected in series between the single cells 10 and the charging circuit 5. The DC power source 61 and the relay 62 configure a charge stop circuit 6 (equivalent to a charge stop device described in Claim.)

Hereinafter, operation of the power supplying device involving the above configuration will be described.

During the charging of the single cells 10, the charging circuit 5 monitors and controls voltages of the single cells 10 so that when each single cell 10 is fully charged to stand at a predetermined voltage, charging operation can be terminated.

When operational failure occurs during charge control in the charging circuit 5 for some reason, there is a risk that a single cell 10 is overcharged. If any of the single cells 10 should be overcharged, the side wall of the single cell 10 will swell out and transform due to a rise in internal pressure of the single cell 10. Accordingly, the push button switch 41 on the single cell 10 will be pressed by contact with the neighboring single cell 10, so that the position of the push button switch 41 will change from open to close. Then current supply to the relay coil 62A will be shut off and the relay switch 62B will open, and consequently charging operation to the single cell 10 will stop.

A single cell 10 can slightly transform even when it is not overcharged. Therefore, it is preferable to leave the space 30 at least 1 mm to avoid false detection.

In this embodiment, even if a single cell 10 is overcharged due to operational failure during charge control in the charging circuit 5, the overcharge can be detected without fail by means of the push button switch 41, and charging operation can be shut off. Furthermore, the push button switch 41 is placed in the space 30 which is originally set up for helping dissipate the heat from the single cells 10, so that the assembled battery device can be provided without having an extra space for installation of the push button switch 41 and resultantly with no increase in size.

In addition, because the push button switch 41 is placed on the center part of the front wall, which holds the largest area of any other side walls in the single cell 10, swelling can be surely detected.

In addition, the application of constant closed contact in the push button switch 41 allows failure of switching operation to be reduced. If a push button switch with constant open contact is used in corrosive atmosphere, corroded product material will adhere all over the contact under such condition that the contact is always kept open. Therefore, when the contact is closed, conduction may be disturbed and this could lead to failure of the performance of switching operation. By contrast, in case of a push button switch with constant closed contact, adhesion of corroded product material can be prevented in the place of contact, so that switching operation will be performed certainly with no fear of conduction disturbance.

Furthermore, when used plurally, push button switches with constant closed contact can be connected in series each other, which makes the circuit configuration easier.

SECOND EMBODIMENT

Figure 5:
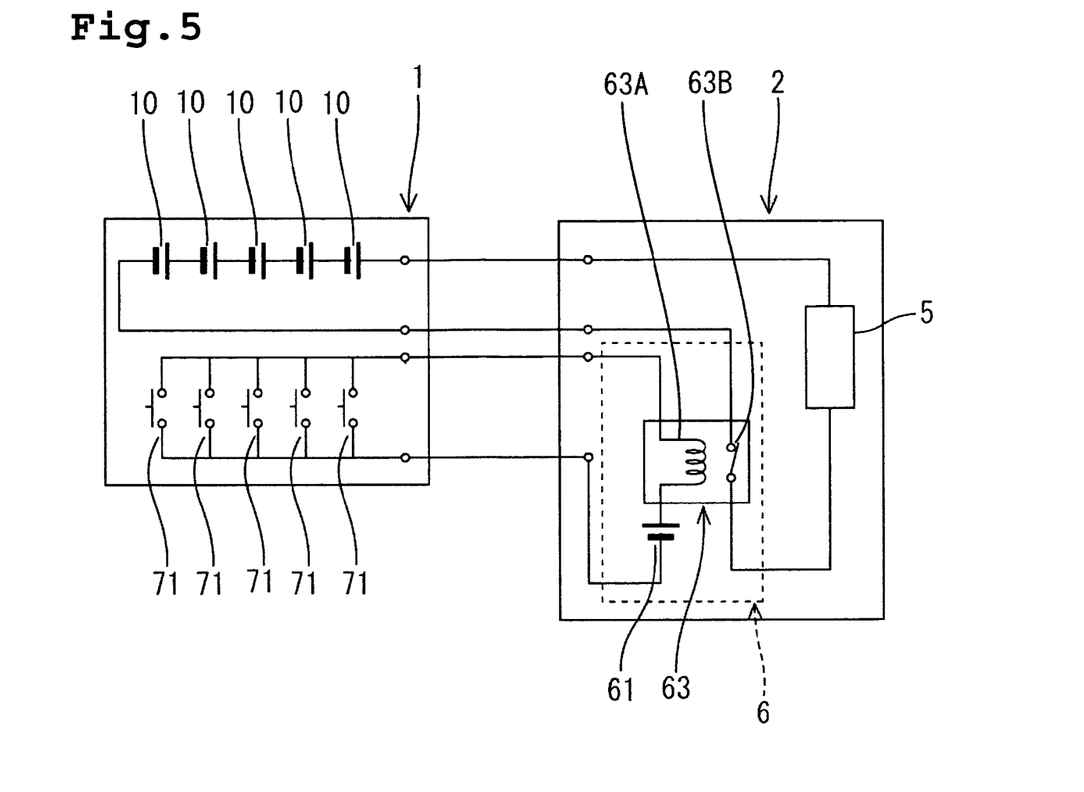
FIG. 5 is a circuit diagram of the power supplying device in accordance with a second embodiment of the present invention.

A second embodiment in which the power supplying device of the present invention is embodied will be described with reference to FIG. 5. In this embodiment, regarding the identical portion as the first embodiment, overlapping description will be omitted with identical code appended.

In this embodiment, by contrast with the first embodiment, push button switches 71 with constant opened contact are used and connected in parallel each other and, in addition, a relay switch 63B with constant closed contact is used in the charge stop circuit 6.

According to this embodiment, when none of the single cells 10 are overcharged and has transformation by swelling, the push button switch 71 remains in the open position, and then since current is not passing into a relay coil 63A, power consumption can be reduced.

THIRD EMBODIMENT

Figure 6:
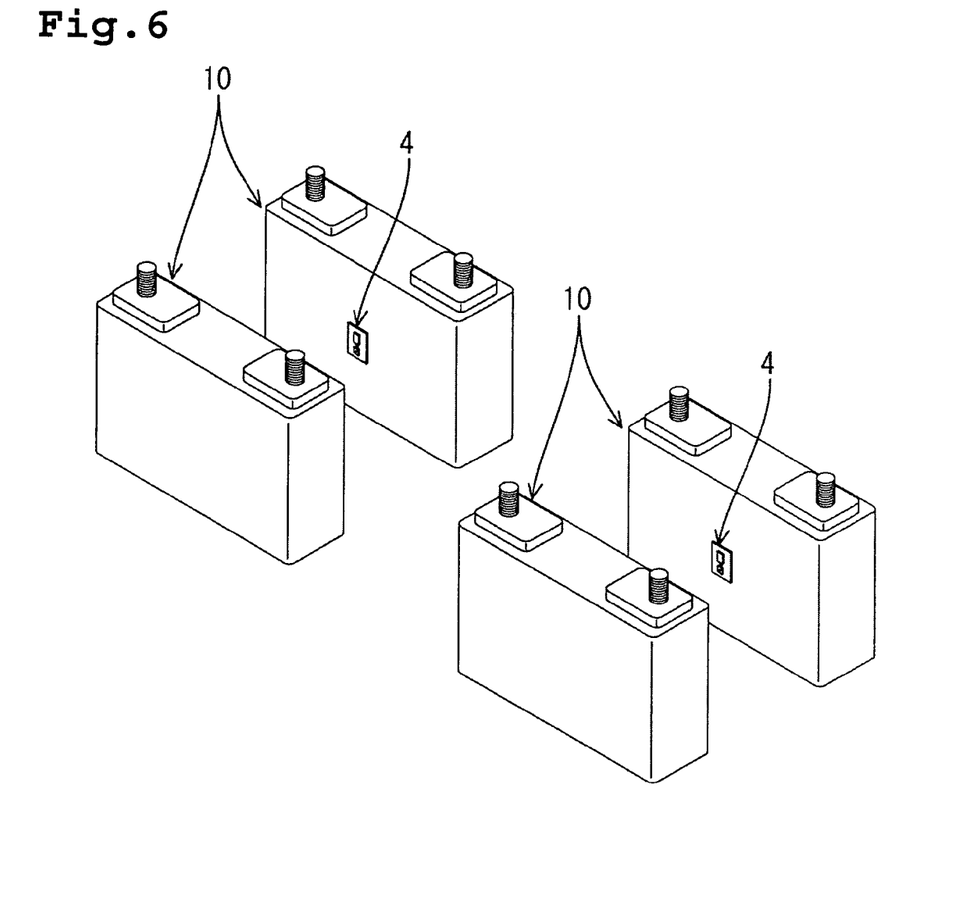
FIG. 6 is a perspective view of the assembled battery device in the power supplying device in accordance with a third embodiment of the present invention.
Figure 7:
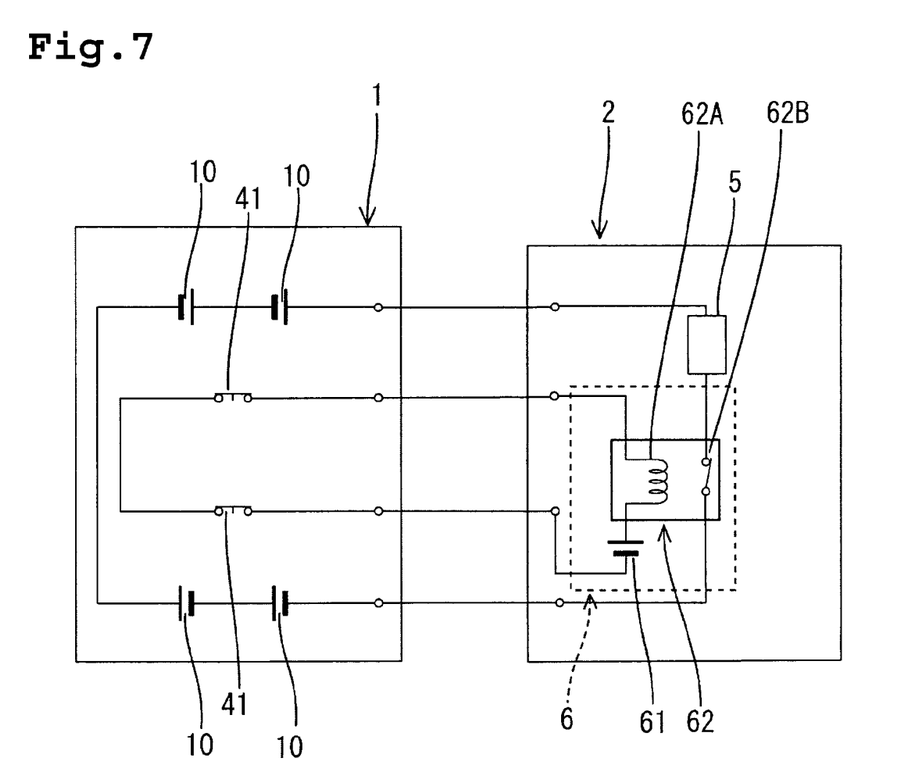
FIG. 7 is a circuit diagram of the power supplying device in accordance with the third embodiment of the present invention.

A third embodiment in which the power supplying device of the present invention is embodied will be described with reference to FIGS. 6 and 7. In this embodiment, regarding the identical portion as the first embodiment, overlapping description will be omitted with identical code appended and, in addition, description regarding similar action/effect is also omitted.

In this embodiment, the arrangement of the single cells 10 differs from that of the first embodiment, where the single cells 10 are set in line in the direction of depth, or one dimensional position (see FIG. 2). By contrast, this embodiment employs two dimensional position, where four single cells 10 are set in two lines in the direction of depth. In addition, on the center of the front wall of each single cell 10 which is placed in the backward position of the single cells 10 adjoining longitudinally, the circuit board 4 is fixed, where push button switches 41 are connected each other in series.

It is not intended that the technical scope of the present invention be limited to the embodiments described above, but rather that the following description, for example, be also included in the technical scope of the present invention.

(1) In the above described embodiments, as an element for detecting swelling, the push button switches 41 and 71 have been used but the detecting means are not limited to them. For example, transformation by swelling can be detected from the distance measured by means of a displace sensor to measure a distance between the side walls of neighboring single cells 10 according to changes in capacitance.

(2) In the above described embodiments, an element for detecting swelling has been installed on each single cell 10 but configuration is not limited to this manner. For example, a push button switch can be installed on any one of the single cells 10, or a push button switch can be installed on every other single cell 10 or every two single cells 10.

Figure 8:
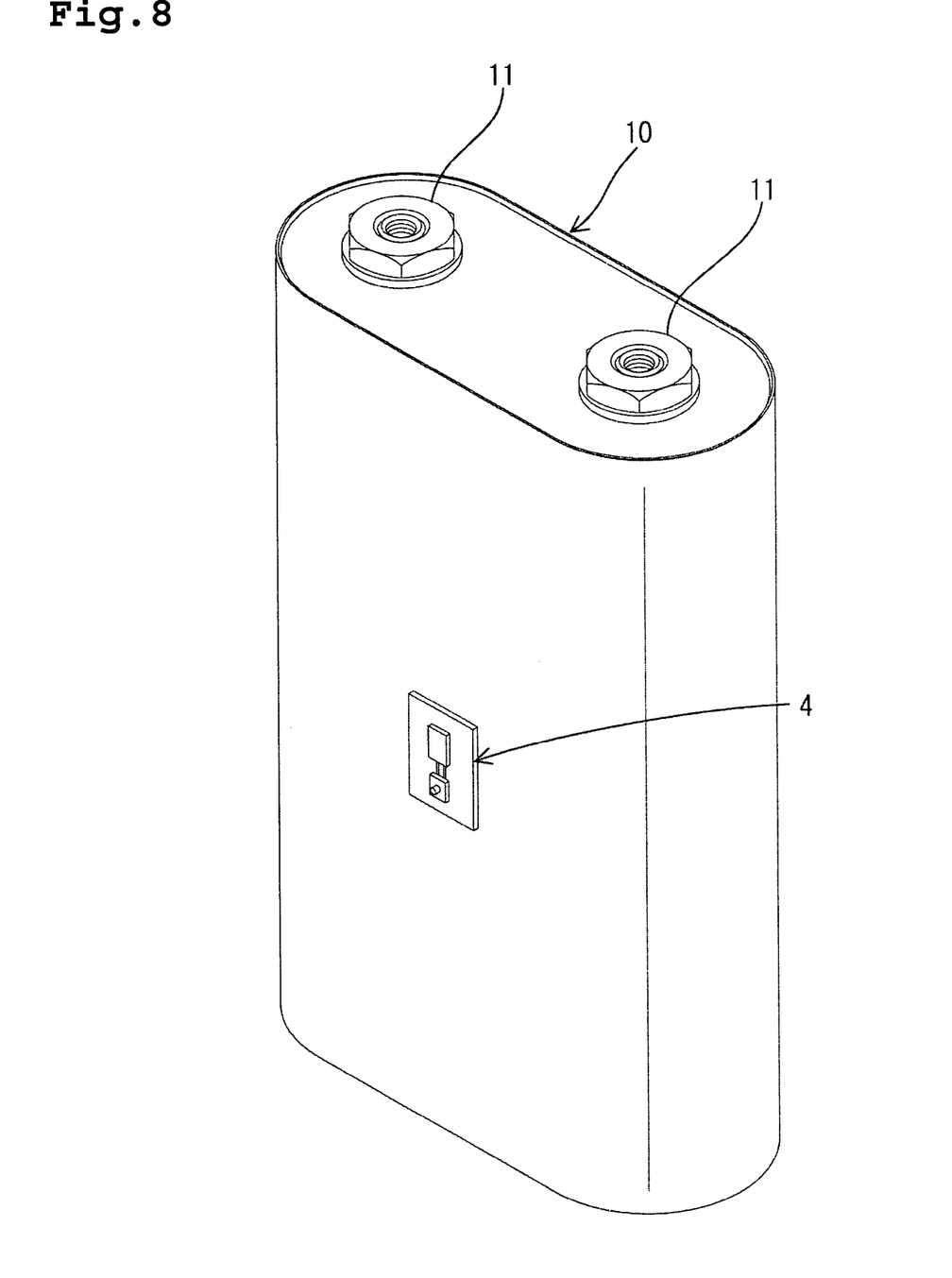
FIG. 8 is a perspective view of single cells of an ellipsoidal shape.

(3) In the above described embodiments, the single cells 10 of a cuboid shape have been used; however, an ellipsoidal shape is also applicable as shown in FIG. 8. In this case, the side walls along the major axis are placed opposite each other and the circuit board 4 is placed on the center part of the side wall, so that transform by swelling can be detected more surely.

(4) In the above described embodiments, the circuit board 4 has been fixed on the single cell 10 with adhesive; however, the circuit board 4 can be fixed on the single cell 10 with, for example, thermal contraction resin.

Figure 9:
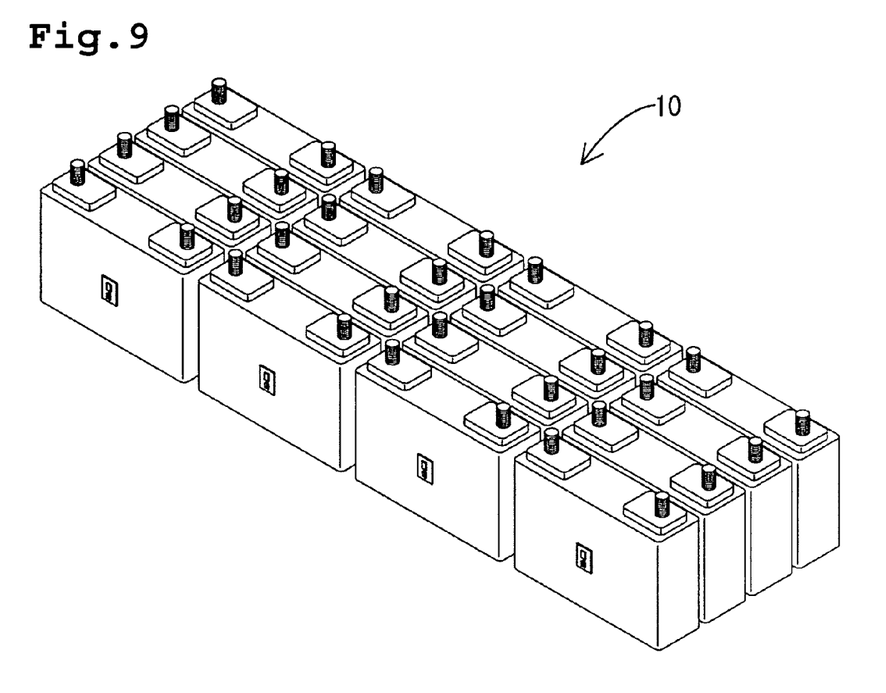
FIG. 9 is a perspective view of the assembled battery device in which single cells are arranged in two dimensional position.
Figure 10:
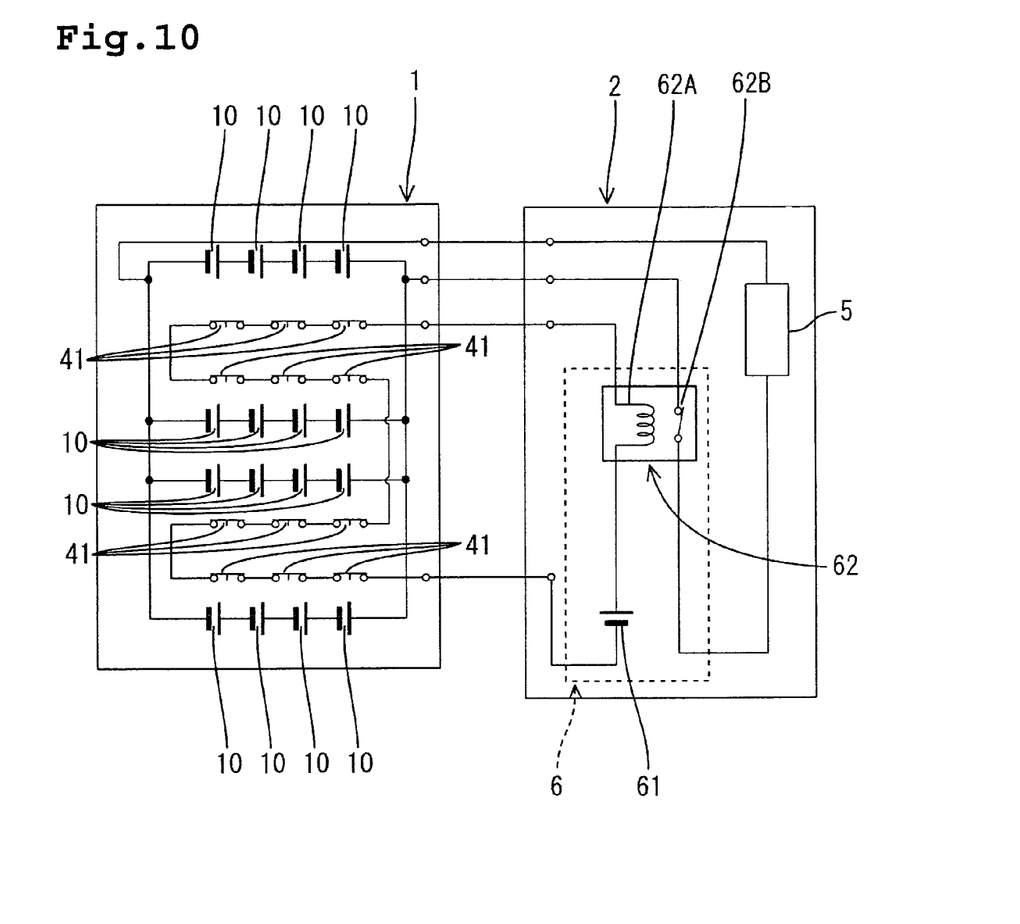
FIG. 10 is a circuit diagram of the power supplying device.

(5) In the third embodiment above described, the single cells 10 have been set in two lines in the direction of depth; however, it is possible to set them in three or more lines. For example, sixteen single cells 10 can be set in four lines in the direction of depth (see FIGS. 9 and 10.)

According to the present invention, an element for detecting swelling is so configured as to detect transform by swelling; therefore, even when a single cell is overcharged and transforms, the overcharging of the single cell can be detected certainly.

In addition, installing an element for detecting swelling in a space, which is originally left between single cells, eliminates the need for an extra space to set up the element for detecting swelling and, moreover, an exclusive space between the element for detecting swelling and an single cell to operate the element for detecting swelling, so that an increase in the size of an assembled battery device can be avoided.

The invention claimed is:

1. An assembled battery device, comprising:
   a plurality of single cells positioned with a predetermined space between adjacent single cells, and placed relative to each other in a manner such that a side wall having a largest area of a first single cell of said plurality of single cells is placed opposite a side wall having a largest area of a second single cell of said plurality of single cells; and
   at least one push button switch positioned within the predetermined space between said adjacent single cells of said plurality of single cells,
   wherein said at least one push button switch includes a constant closed electrical contact.

2. The assembled battery device according to claim 1, wherein said at least one push button switch is positioned at an approximate center of said side wall having a largest area of said first or said second single cell.

3. The assembled battery device according to claim 1, wherein said plurality of single cells comprises three or more single cells, and said at least one push button switch comprises a plurality of push button switches connected to each other in a series electrical connection.

4. The assembled battery device according to claim 2, wherein each of said plurality of single cells has a cuboid shape.

5. The assembled battery device according to claim 2, wherein each of said plurality of single cells has an elliptic cylindrical shape in cross section, and said side wall having a largest area of said first or said second single cell is along the major axis of the ellipse in a cross section of said single cell.

6. The assembled battery device according to claim 2, wherein each said side wall having a largest area is flat.

7. The assembled battery device according to claim 3, wherein each of said plurality of push button switches includes a constant closed electrical contact.

8. An assembled battery device, comprising:
   a plurality of single cells positioned with a predetermined space between adjacent single cells and configured such that a side wall of a first single cell of said plurality of single cells is placed opposite a side wall of a second single cell of said plurality of single cells; and
   a plurality of detection elements at least one of said detection elements being positioned within each predetermined space between said adjacent single cells of said plurality of single cells, each of the detection elements being operable to detect the swelling of at least one of said adjacent single cells, and the detection elements being connected to each other in a series electrical connection.

9. The assembled battery device according to claim 8, wherein said at least one detection element comprises a push button switch positioned at an approximate center of said side wall having a largest area of said first or said second single cell.

10. The assembled battery device according to claim 8, wherein said plurality of detection elements are push button switches.

11. The assembled battery device according to claim 9, wherein the push button switch includes a constant closed electrical contact.

12. The assembled battery device according to claim 9, wherein the push button switch detects swelling of the single cell by being pushed by said side wall of said first or said second single cell within the predetermined space.

13. The assembled battery device according to claim 10, wherein each push button switch includes a constant closed electrical contact.

* * * * *